(12) United States Patent
Sakai

(10) Patent No.: US 10,931,852 B2
(45) Date of Patent: Feb. 23, 2021

(54) IMAGE PROCESSING APPARATUS, IMAGE PROCESSING METHOD, AND STORAGE MEDIUM, WITH DETERMINING WHETHER OR NOT CHARACTER CLIPPING RECTANGLE DETERMINED TO BE NON-CHARACTER REGION IS CHARACTER REGION

(71) Applicant: CANON KABUSHIKI KAISHA, Tokyo (JP)

(72) Inventor: Hiroyuki Sakai, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/574,383

(22) Filed: Sep. 18, 2019

(65) Prior Publication Data
US 2020/0099821 A1 Mar. 26, 2020

(30) Foreign Application Priority Data
Sep. 26, 2018 (JP) .............................. JP2018-180941

(51) Int. Cl.
*H04N 1/40* (2006.01)
*G06K 9/32* (2006.01)
*H04N 1/32* (2006.01)
*G06K 9/34* (2006.01)

(52) U.S. Cl.
CPC ....... *H04N 1/40062* (2013.01); *G06K 9/3233* (2013.01); *G06K 9/344* (2013.01); *H04N 1/32459* (2013.01); *H04N 1/40012* (2013.01); *H04N 2201/0094* (2013.01)

(58) Field of Classification Search
None
See application file for complete search history.

(56) References Cited

U.S. PATENT DOCUMENTS

| | | | |
|---|---|---|---|
| 7,133,565 B2 | 11/2006 | Toda et al. | |
| 9,807,280 B2 | 10/2017 | Misawa et al. | |
| 2002/0037100 A1 | 3/2002 | Toda et al. | |
| 2013/0148886 A1* | 6/2013 | Misawa | G06T 9/00 |
| | | | 382/165 |
| 2014/0173394 A1* | 6/2014 | Kashibuchi | G06F 40/103 |
| | | | 715/201 |
| 2015/0181077 A1 | 6/2015 | Misawa et al. | |
| 2018/0020118 A1 | 1/2018 | Misawa et al. | |

FOREIGN PATENT DOCUMENTS

| | | |
|---|---|---|
| JP | 2002-077633 A | 3/2002 |
| JP | 2015-195549 A | 11/2015 |

\* cited by examiner

*Primary Examiner* — Andrew H Lam
(74) *Attorney, Agent, or Firm* — Venable LLP

(57) ABSTRACT

An image processing apparatus generates a binary image from a multivalue input image, detects a character region and a non-character region from the binary image, and clips regions surrounding each of characters included in the detected character region as character clipping rectangles. The apparatus determines, on the basis of a black pixel density of the binary image included in the character clipping rectangle, whether or not the character clipping rectangle is a character region and determines, on the basis of a number of pixels included in the character clipping rectangle determined to be a non-character region, whether or not the character clipping rectangle determined to be a non-character region is a character region.

10 Claims, 15 Drawing Sheets

IMAGE PROCESSING APPARATUS, IMAGE PROCESSING METHOD, AND STORAGE MEDIUM, WITH DETERMINING WHETHER OR NOT CHARACTER CLIPPING RECTANGLE DETERMINED TO BE NON-CHARACTER REGION IS CHARACTER REGION

BACKGROUND OF THE INVENTION

Field of the Invention

The present invention relates to an image processing apparatus, an image processing method, and a storage medium.

Description of the Related Art

The recent spread of color printers, color scanners and the like has led to an increase in documents being printed in color, which provides more opportunities for such documents to be scanned and saved as electronic files, sent to third parties or the like over the Internet, and so on. However, keeping files as full-color data places a heavy load on storage devices, networks, and so on. It is therefore necessary to reduce data amounts through compression processing.

Thus far, methods for compressing color images have included using error diffusion or the like for compressing the data as a binary image having pseudo halftones, compressing in the JPEG format, converting into 8-bit palette colors and then compressing in a format such as ZIP or LZW, and others, for example. However, compressing high-frequency parts such as characters using the JPEG format produces image degradation known as "mosquito noise", and also has a lower compression rate.

According to Japanese Patent Laid-Open No. 2002-077633, a character region present in an input image is detected, and the character part of the character region is compressed as a binary image through MMR compression (binary lossless compression) and saved as a file along with character color information for each character. Furthermore, a background image is generated by filling the character part of the input image with a color from the surrounding area, JPEG compression (lossy compression) is performed thereon at a reduced resolution, and the resultant data is saved in the file. The document says that a file compressed using this compression method provides both high quality for the character region and a higher compression rate.

Additionally, according to Japanese Patent Laid-Open No. 2015-195549, a binary image of an input image is generated, a character region within the binary image and regions surrounding each character are obtained as character clipping rectangular information, and it is then determined whether or not each character clipping rectangle contains a character that is separated from the background. The document says that the character region and background can be separated with a higher level of accuracy, which makes it possible to prevent pixelation in the image caused by the binarization of non-character regions (e.g., parts having photo images or gradations).

Furthermore, when it is determined, in the process for separating the characters from the background, whether or not the character clipping rectangle surrounding each character contains a character separated from the background, whether or not something is a character is determined based on the black pixel density within the character clipping rectangle. This ensures that clusters of black pixels that are within the character clipping rectangles but are not characters (e.g., a photo image near the character region) are not determined to be characters.

When using the above stated process for determining whether or not something is a character based on the black pixel density, characters having a high black pixel density within character clipping rectangles (e.g., bold text with a high number of pixels) are sometimes determined not to be characters. JPEG compression is applied to such regions determined not to be characters. As a result, low-quality characters to which JPEG compression has been applied appear in high-quality character strings compressed with MMR, which is problematic in that the character string becomes illegible.

SUMMARY OF THE INVENTION

An aspect of the present invention is to eliminate the above-mentioned problem with conventional technology.

The feature of the present invention is to provide a technique that makes it possible to accurately determine whether a region is a character region or a non-character region even for bold text with a high number of pixels, for example.

According to a first aspect of the present invention, there is provided an image processing apparatus comprising: a memory device that stores instructions; and at least one processor that executes the instructions stored in the memory device to cause the image processing apparatus to function as: a binarizing unit configured to generate a binary image from a multivalue input image; a detecting unit configured to detect a character region and a non-character region from the binary image; a clipping unit configured to clip regions surrounding each of characters included in the character region detected by the detecting unit as character clipping rectangles; a first determining unit configured to determine, on the basis of a black pixel density of the binary image included in the character clipping rectangle, whether or not the character clipping rectangle is a character region; and a second determining unit configured to determine, on the basis of a number of pixels included in the character clipping rectangle determined to be a non-character region by the first determining unit, whether or not the character clipping rectangle determined to be a non-character region is a character region.

According to a second aspect of the present invention, there is provided an image processing apparatus comprising: a memory device that stores instructions; and at least one processor that executes the instructions stored in the memory device to cause the image processing apparatus to function as: a binarizing unit configured to generate a binary image from a multivalue input image; a detecting unit configured to detect a character region and a non-character region from the binary image; a clipping unit configured to clip regions surrounding each of characters included in the character region detected by the detecting unit as character clipping rectangles; a first determining unit configured to determine, on the basis of a black pixel density of the binary image included in the character clipping rectangle, whether or not the character clipping rectangle is a character region; and a second determining unit configured to determine, on the basis of the center of a character clipping rectangle determined to be a non-character region by the first determining unit and the center of the closest character clipping rectangle among the character clipping rectangles determined to be character regions by the first determining unit, whether or not the character clipping rectangle determined to be a non-character region is a character region.

According to a third aspect of the present invention, there is provided an image processing method comprising: generating a binary image from a multivalue input image; detecting a character region and a non-character region from the binary image; clipping regions surrounding each of characters included in the character region detected in the detecting as character clipping rectangles; making a first determination, on the basis of a black pixel density of the binary image included in the character clipping rectangle, as to whether or not the character clipping rectangle is a character region; and making a second determination, on the basis of a number of pixels included in the character clipping rectangle determined to be a non-character region in the first determination, whether or not the character clipping rectangle determined to be a non-character region is a character region.

According to a fourth aspect of the present invention, there is provided an image processing method comprising: generating a binary image from a multivalue input image; detecting a character region and a non-character region from the binary image; clipping regions surrounding each of characters included in the character region detected in the detecting as character clipping rectangles; making a first determination, on the basis of a black pixel density of the binary image included in the character clipping rectangle, as to whether or not the character clipping rectangle is a character region; and making a second determination, on the basis of the center of a character clipping rectangle determined to be a non-character region in the first determination and the center of the closest character clipping rectangle among the character clipping rectangles determined to be character regions in the first determination, whether or not the character clipping rectangle determined to be a non-character region is a character region.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

Embodiments of the present invention will be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention.

First Embodiment

Figure 1:
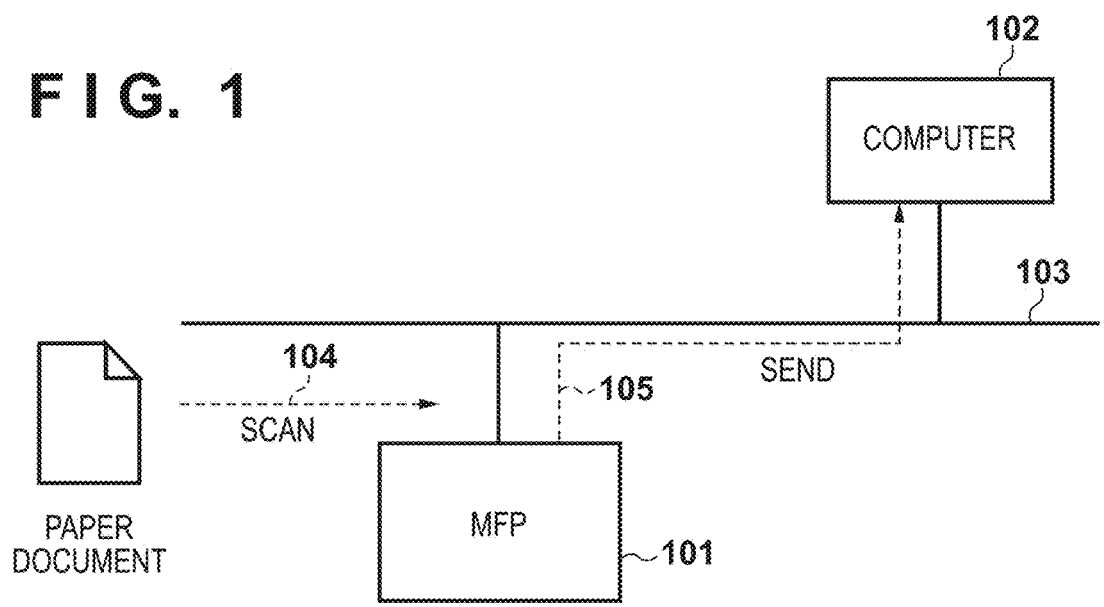
FIG. 1 is a diagram illustrating the overall configuration of a system including an image processing apparatus according to a first embodiment of the present invention.

FIG. 1 is a diagram for describing the overall configuration of a system including an image processing apparatus according to a first embodiment of the present invention. In the first embodiment, a multi-function peripheral (MFP) 101, which is an example of the image processing apparatus according to the present invention, and a computer ("PC" hereinafter) 102 are connected over a network 103. In FIG. 1, the dotted lines 104 and 105 indicate the flow of processing, where the dotted line 104 indicates processing through which a user uses a scanner of the MFP 101 to read a paper document. At this time, the user can use a user interface of the MFP 101 (described later; a console unit 203 indicated in FIG. 2) to specify the destination where the scanned image is to be sent (e.g., the PC 102), make various settings pertaining to scanning and sending, and the like. As these various settings, the user can specify the resolution, compression rate, data format (e.g., JPEG, TIFF, PDF, high-compression PDF, or high-compression PDF (with OCR results)), and the like. The first embodiment will describe a case where high-compression PDF is specified as the data format. Details regarding high-compression PDF will be given later. The dotted line 105 indicates processing through which data is generated on the basis of the various specified settings, using software or hardware functions of the MFP 101, and the data is sent to a specified destination (e.g., the PC 102). Here, the image data sent to the PC 102 is sent in a file format such as PDF, and can therefore be viewed with a generic viewer installed in the PC 102.

Figure 2:
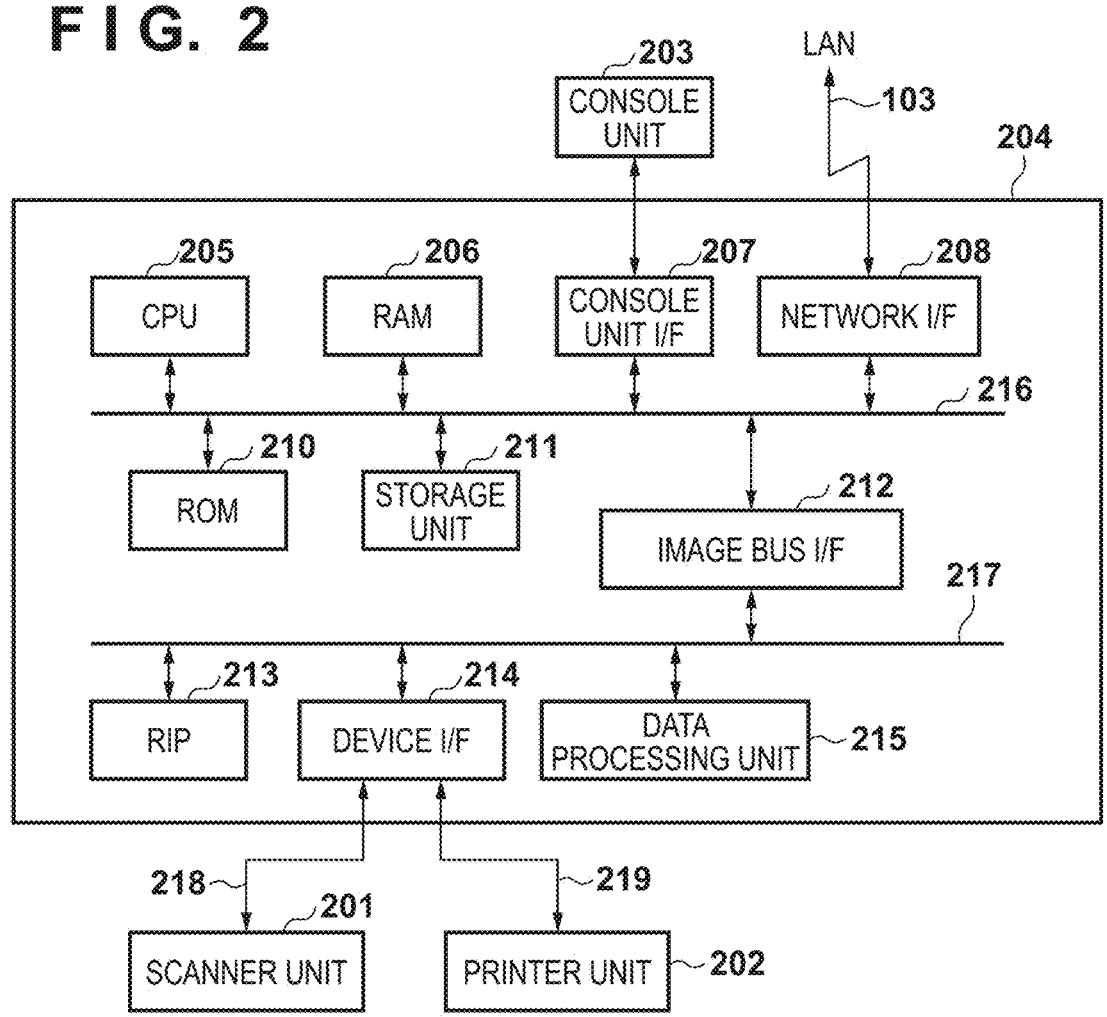
FIG. 2 is a block diagram for describing the hardware configuration of an MFP according to the first embodiment of the present invention.

FIG. 2 is a block diagram for describing the hardware configuration of the MFP 101 according to the first embodiment of the present invention.

The MFP 101 includes a scanner unit 201, which is an image input device; a printer unit 202, which is an image output device; a control unit 204 that controls the operations of the MFP 101; the console unit 203, which is a user interface; and the like. The control unit 204 is connected to the scanner unit 201, the printer unit 202, and the console unit 203, and is furthermore connected to the network 103, and can therefore input and output image data, device information, and the like. A CPU 205 is a processor that controls the MFP 101 as a whole. RAM 206 is system work memory used for operations by the CPU 205, and is also image memory that temporarily stores image data. ROM 210 serves as a boot ROM and stores programs such as a boot program. A storage unit 211 is a hard disk drive, for example, and stores system control software, image data, and the like. A console unit I/F (interface) 207 is an interface unit for the console unit 203, and outputs image data, to be displayed in the console unit 203, to the console unit 203. The console unit I/F 207 also serves to communicate information, which has been input by the user through the console unit 203, to the CPU 205. A network I/F 208 connects the MFP 101 to the network 103, and inputs/outputs information in packets. The abovementioned devices are provided on a system bus 216. An image bus I/F 212 is a bus bridge for connecting the system bus 216 and an image bus 217 that transfers image data at high speeds, and converting data structures. The image bus 217 is constituted using a PCI bus or IEEE 1394, for example.

The following devices are provided on the image bus 217. A raster image processor (RIP) 213 implements what is known as a "rendering process" by analyzing page description language (PDL) code and rasterizing the code into a bitmap image having a specified resolution. A device I/F 214 is connected by a signal line 218 to the scanner unit 201, and by a signal line 219 to the printer unit 202, and carries out synchronous/asynchronous image data conversion. A data processing unit 215 carries out image processing on scan data input from the scanner unit 201 and image processing on print image data to be output to the printer unit 202, as well as high-compression PDF, OCR, and similar processing. Compressed data in the PDF format (mentioned later; indicated by a reference numeral 515 in FIG. 5) is generated as a result. The compressed data generated in this manner is sent to a specified destination (e.g., the PC 102) through the network I/F 208 and the network 103. This data processing unit 215 can also decompress compressed data received through the network I/F 208 and the network 103. The decompressed image data may be then sent to the printer unit 202 through the device I/F 214 and printed, or stored in the storage unit 211. The data processing unit 215 will be described in detail later.

The configurations of an image compression unit and an image decompression unit realized by the data processing unit 215 according to the first embodiment will be described next with reference to the block diagrams in FIGS. 5 and 6. As described earlier, the data processing unit 215 may be configured to function as the respective processing modules in FIGS. 5 and 6 by a processor executing computer programs, or some or all of those processing modules may be constituted by hardware such as ASICs or electronic circuits. The descriptions of the first embodiment will assume that the functions of the data processing unit 215 are realized by the CPU 205 deploying programs in the RAM 206 and executing those programs.

As described in Japanese Patent Laid-Open No. 2002-077633, for example, high-compression PDF processing carries out region determination on an attribute-by-attribute basis and uses MMR binary lossless compression or JPEG multivalue lossy compression adaptively in accordance with the attributes of each region. In other words, character regions are subject to MMR compression while images filled with the color around the character regions are subject to JPEG compression. This makes it possible to both increase the compression rate and achieve a high level of quality for the character regions. This high-compression PDF processing is a useful compression technique for color or black-and-white multivalue images. Although details will be given later, in the first embodiment, image information within a character region can be used to make a second determination regarding a character, within the character region, which was erroneously determined earlier. This makes it possible to correctly determine whether or not even bold text having a high number of strokes within a character string is a character, which in turn makes it possible to improve the overall legibility of the character string.

Figure 5:
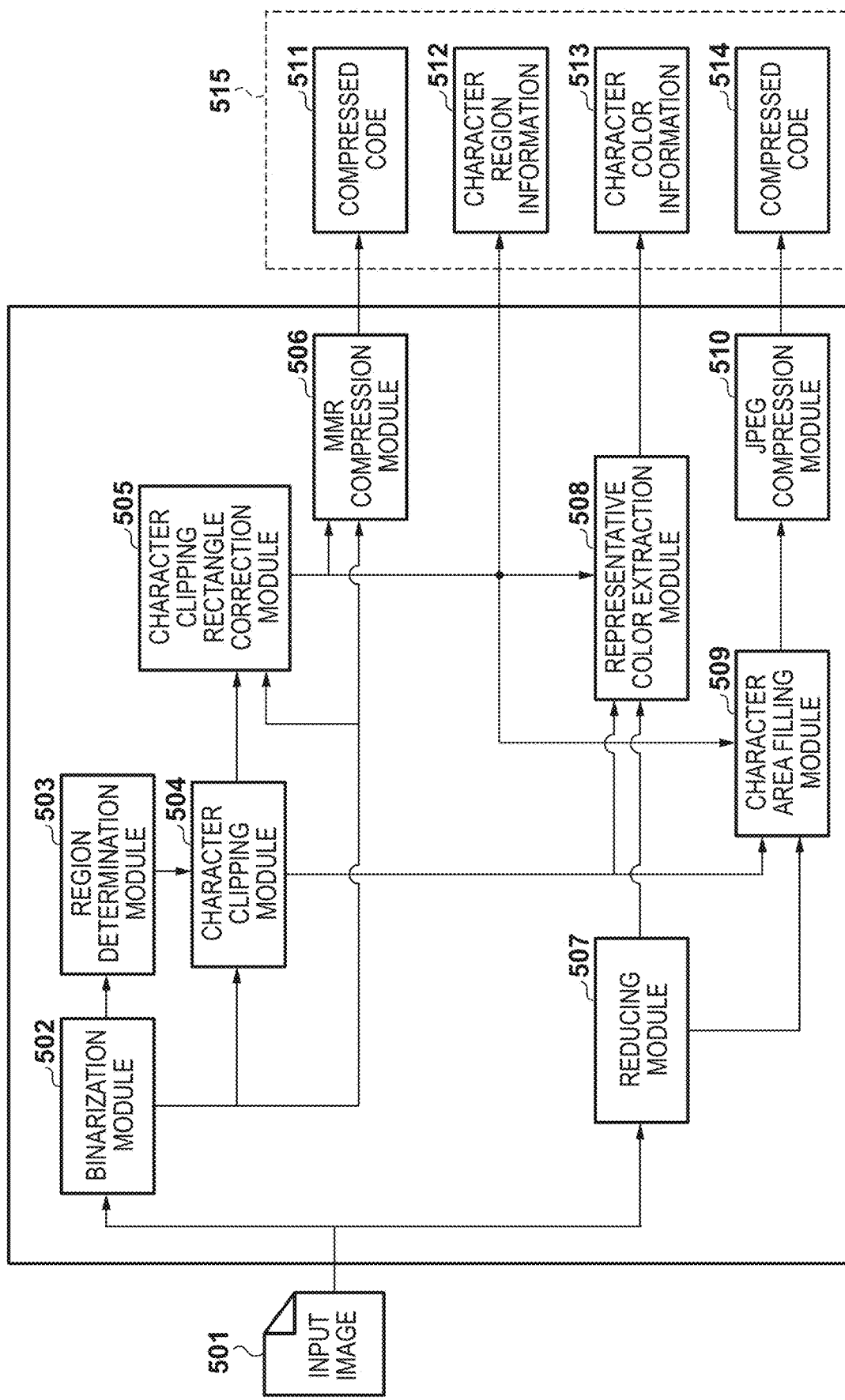
FIG. 5 is a block diagram for describing the configuration of an image compression unit realized by a data processing unit, according to the first embodiment.

FIG. 5 is a block diagram for describing the configuration of the image compression unit realized by the data processing unit 215 according to the first embodiment, and indicates the processing modules for generating a high-compression PDF by compressing input image data.

A binarization module 502 generates a binary image from an input image 501, which is multivalue image data obtained by the scanner unit 201 reading a document. In this binary image, pixels in the input image 501 that have a higher density than a threshold become black pixels, for example, whereas pixels that have a lower density than the threshold become white pixels, for example (of course, the binarization result may be expressed by other colors aside from black and white, or may be expressed as "1" or "0" instead of colors, for example). Although the purpose of the binarization module 502 is to distinguish between pixels having a higher density than the threshold and pixels having a lower density than the threshold, a method aside from binarization may be used as long as it meets the same purpose (e.g., ternarization or quaternization). However, the following descriptions assume binarization by the binarization module 502. Here, when the input image 501 is, for example, an image such as that indicated by a reference numeral 701 in FIG. 7A, the binary image becomes a monochromatic image such as that indicated by a reference numeral 702 in FIG. 7B.

FIGS. 7A to 7G depict views illustrating an example of a process for determining a character region and a non-character region in an input image, and extracting a character from the character region according to the first embodiment. Note that when the input image is a color multivalue image, the binarization is carried out only on the luminance of that multivalue image (e.g., the Y component of YUV). A known technique is used for the method of calculating the threshold used in the binarization. For example, the threshold may be calculated from a luminance histogram of the overall image, or a desired value may be used as the threshold.

A region determination module 503 detects a character region and a photo image region from the binary image generated by the binarization module 502. An overview of the region determination will be given here with reference to FIG. 16.

Figure 16:
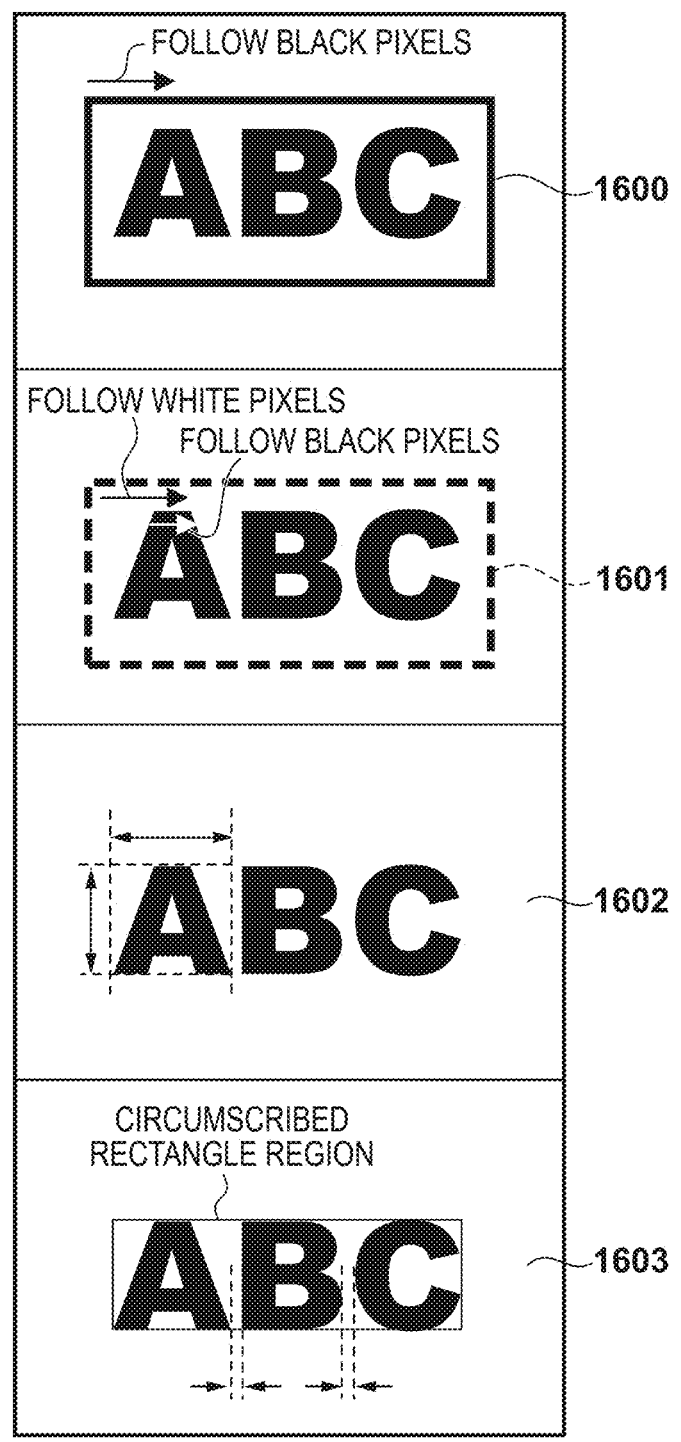
FIG. 16 depicts a view illustrating a specific example of region determination according to the first embodiment.

FIG. 16 depicts a view illustrating a specific example of region determination according to the first embodiment.

(1) A cluster of black pixels is extracted by following the contours of black pixels in the binary image. In following the contours, it is determined whether black pixels continue in any one of eight directions, namely upper-left, left, lower-left, down, lower-right, right, upper-right, and up. The framed part 1600 in FIG. 16, for example, is extracted as a cluster of black pixels.

(2) If the extracted cluster of black pixels includes a region of a cluster of black pixels exceeding a set size, it is determined whether there is a cluster of white pixels in the region. In other words, a cluster of white pixels is extracted by following the contours of white pixels within the region of the cluster of black pixels. The cluster of white pixels is extracted by following the contours of the white pixels within the frame line 1601 in FIG. 16, for example. Furthermore, when the extracted cluster of white pixels exceeds a set size, a cluster of black pixels is extracted by once again following the contours of the black pixels within the cluster of white pixels. The cluster of black pixels is extracted by following the contours of the black character part in the frame line 1601 in FIG. 16, for example. These processes are repeated until the clusters of pixels are no greater than the set size. The purpose of this process is to extract the character regions within the region surrounding by the frame lines or the like.

(3) The obtained cluster of black pixels is classified as either a character or a photo image using at least one of the size, shape, and black pixel density. For example, a cluster of black pixels having an aspect ratio near 1 and a size within a set range, as is the case with the letter "A" indicated in a reference numeral 1602 of FIG. 16, is determined to be a cluster of black pixels constituting a character. The remaining cluster of black pixels is determined to be a cluster of pixels constituting a photo image.

(4) When there is little distance between the end parts of clusters of black pixels constituting characters, those clusters of black pixels are classified into the same group. Then, a circumscribed rectangle region that contains all of the clusters of black pixels classified into the same group is then determined to be the character region. For example, when there is little distance between characters as indicated by a reference numeral 1603 in FIG. 16, the character string "ABC" is determined to be a single character region. If there is another cluster of black pixels constituting a character that is not within a predetermined distance, the cluster of black pixels constituting the character constitutes a single group on its own. Accordingly, a circumscribed rectangle region around that single cluster of black pixels is determined to be a character region. Processing similar to that described with reference to the reference numeral 1603 is assumed to be carried out for clusters of black pixels constituting photo images as well. The position of each region and attribute determination information of that region (whether a character or a photo image) is then output as a determination result.

Figure 7A:
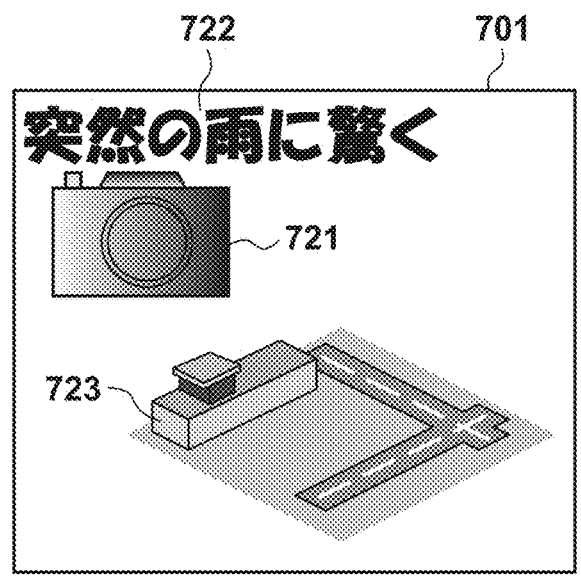
FIGS. 7A to 7G depict views illustrating an example of a process for determining a character region and a non-character region in an input image, and extracting a character from the character region according to the first embodiment.
Figure 7B:
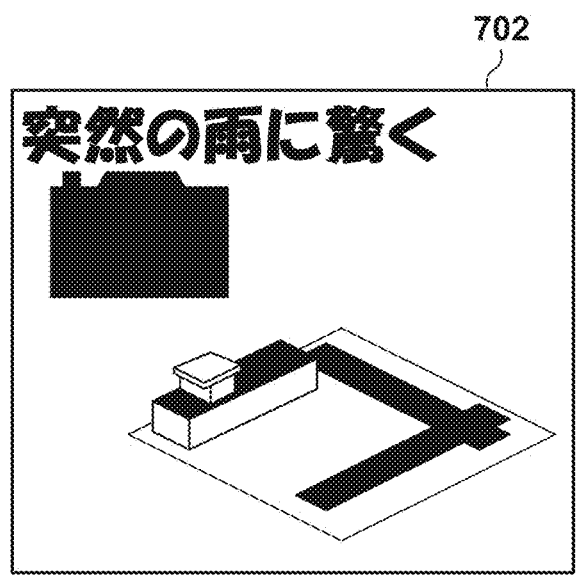
Figure 7C:
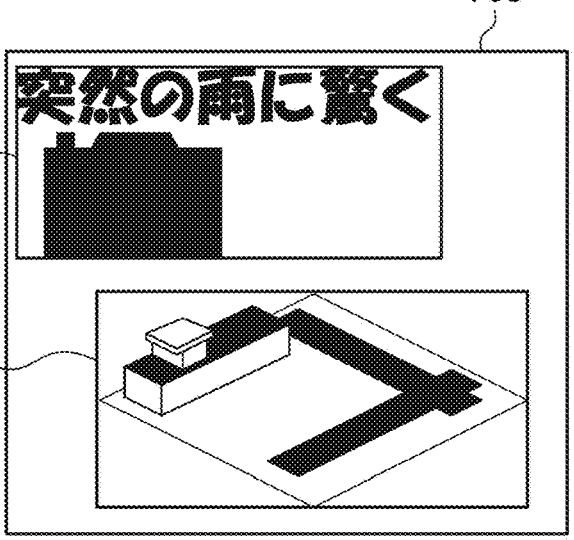

As a result of the processing illustrated in FIG. 16, when the binary image input to the region determination module 503 is an image 702 in FIG. 7B, for example, a region 704 is determined to be the character region, as illustrated in FIG. 7C. In a region 705, the aspect ratio of the cluster of black pixels is far from 1, and a determination result indicating that the region may be a photo image region is therefore output. This ends the descriptions of the region determination module 503.

A character clipping module 504 carries out a process for clipping a character clipping rectangle on each character region generated by the region determination module 503. The clipped results end up as character clipped rectangles, indicated by reference numerals 715 and 716 in FIGS. 7F and 7G. This clipping process includes the following processes (A) to (E).

Figure 7D:
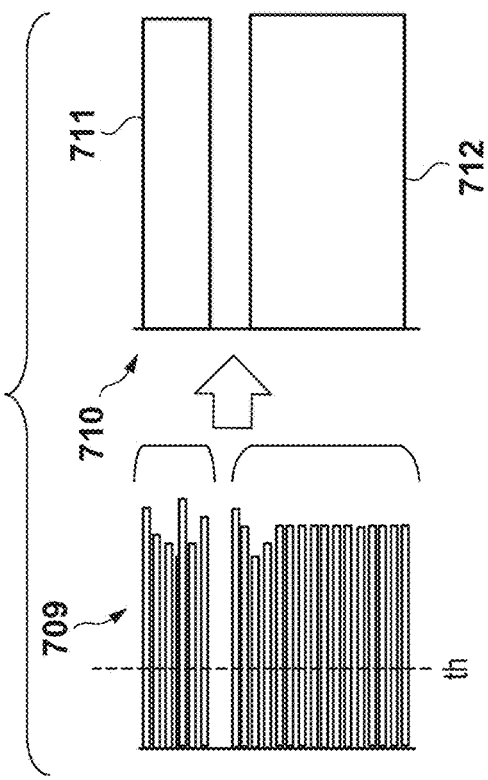
Figure 7E:
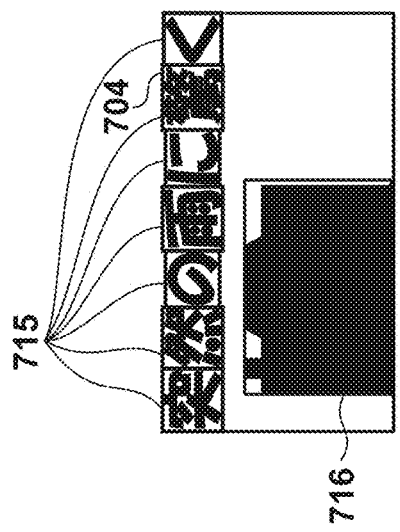

(A) Selecting the character region (e.g., selecting the region 704 in FIG. 7D).

(B) Counting how many black pixels are present in the selected character region 704 in the direction of the arrow 708 (the horizontal direction). The result is indicated by a reference numeral 709 in FIG. 7E. In the reference numeral 709, the lines consecutive in the vertical direction, in which the number of black pixels is greater than a threshold th, are taken as a single group. Two groups 711 and 712 are extracted as a result, as indicated by a reference numeral 710 in FIG. 7E. These two groups 711 and 712 are a group 711, which includes a set of lines in which the character string indicated by a reference numeral 706 is present, and a group 712, which includes a set of lines in which an image shot by a camera, indicated by a reference numeral 707, is present.

Figure 7F:
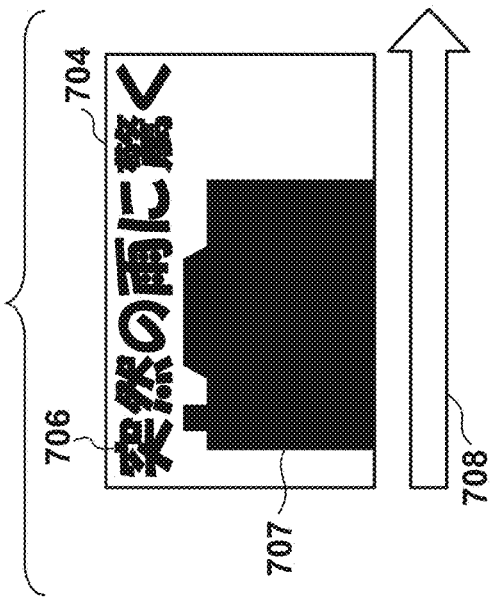

(C) Counting how many black pixels are present in the direction of the arrow 713 in FIG. 7F (the vertical direction), for each of the groups 711 and 712, and taking consecutive lines as individual groups. For example, when the process is carried out on the group 711, seven groups are extracted, as indicated by a reference numeral 714. Each of these seven groups is a set of lines in which characters are present.

(D) Clipping a circumscribing rectangle around each group, constituted by a set of lines, obtained in (C), and taking that rectangle as a character clipped rectangle. As a result, the circumscribing rectangle of each character is clipped as a character clipped rectangle, for example. The clipping results are indicated by reference numerals 715 and 716 in FIGS. 7F and 7G.

(E) Repeating the processes of (A) to (D) until no unselected character regions are left.

A specific example of an image to be processed, and a result of carrying out the binarization, region determination, and character clipping processing, will be described next with reference to FIGS. 7A to 7G.

The input image 701 in FIG. 7A corresponds to the input image 501 illustrated in FIG. 5. A reference numeral 721 denotes a region of a photo rendered with a dark gradation, a reference numeral 722 denotes a character string written with black characters, and a reference numeral 723 denotes a photo image with large vertical and horizontal dimensions. The binary image 702 in FIG. 7B is a binary image obtained by binarization performed by the binarization module 502. The photo image region 721 has been binarized at a threshold having a lower value than the overall gradation of the photo image, and has thus become completely black. The image 703 in FIG. 7C indicates a result of the region determination module 503 determining the character regions and the photo image regions. Here, it is assumed that the region 704 is determined to be a character region, while the region 705 is determined to be a photo image region.

Figure 7G:
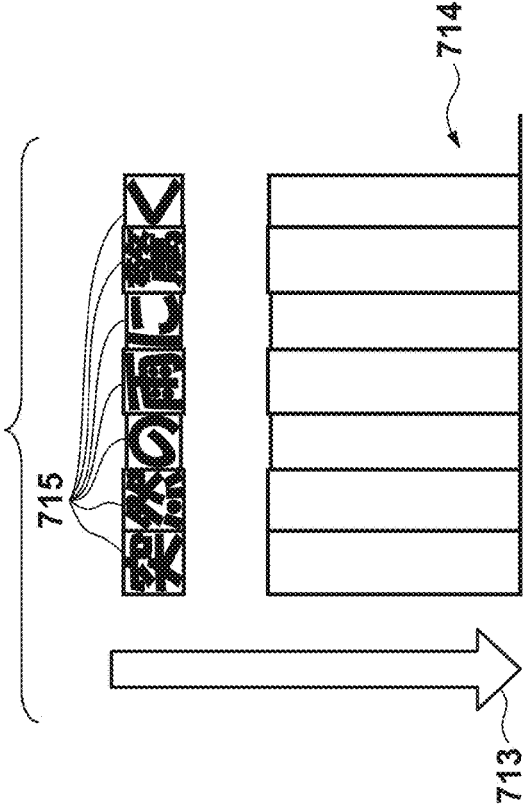

FIG. 7G is a schematic diagram illustrating a character clipping rectangle clipped by the character clipping module 504. A reference numeral 715 denotes the character clipping rectangle for the character region 704.

A character clipping rectangle correction module 505 determines whether or not a character image within the character clipping rectangle clipped by the character clipping module 504 is a non-character region. The method by which the character clipping rectangle correction module 505 makes this determination will be described in detail later.

On the basis of information of a character region determined to be a "non-character region filled with black due to binarization", the character clipping rectangle correction module 505 corrects the character clipping rectangular information generated by the character clipping module 504. In other words, when the black pixel density is high, the region is determined to be "a region that was erroneously determined to be a non-character region", whereas when the black pixel density is low, the region is determined to be "a region that does indeed seem like a character". It is further determined whether or not the number of pixels in the non-character rectangular region is similar to the average number of pixels in the character rectangles in that character region. The character clipping rectangle with non-character attributes determined to have a similar number of pixels is re-determined to be a character clipping rectangle with character attributes. Doing so makes it possible to correct region attributes based on the black pixel density, for characters with a large number of strokes or bold characters. This is turn makes it possible to correctly determine even characters that have been determined to be rectangles with non-character attributes, and the legibility of the character part as a whole can be improved.

An MMR compression module 506 extracts a binary image of a character region from the binary image generated by the binarization module 502, on the basis of the character region information following the correction by the character clipping rectangle correction module 505. In other words, only a binary image included in a character clipping rectangle determined to be "a character image easily separable from the background" is extracted. The extracted binary image of the character region is subjected to MMR compression, and compressed code 511 is generated as a result.

On the other hand, the input image 501 is reduced (or converted to low resolution) by a reducing module 507, and a reduced multivalue image (not shown) is generated. In the first embodiment, a 300-dpi input image is reduced to 150 dpi.

A representative color extraction module 508 specifies the positions of the pixels (black pixels) constituting each character in the binary image, on the basis of the character region information and the character clipping rectangular information following the correction by the character clipping rectangle correction module 505. Then, on the basis of the specified positions of the pixels of the characters, the representative color extraction module 508 refers to the colors at the corresponding positions in the reduced multivalue image and calculates a representative color of the characters in units of character clipping rectangles to obtain character color information 513 of each character. For example, the representative color is the average or weighted average of the colors in the multivalue image of the group of pixels that, in the character clipping rectangle, became black in the binary image. Alternatively, the representative color is the color appearing most frequently in such a pixel group. Thus while a variety of methods for finding the representative color are conceivable, the color, in the multivalue image, of at least one pixel in the pixel group that, in the character clipping rectangle, became black in the binary image, is used to calculate the representative color.

A character area filling module 509 specifies the positions of the pixels (the black pixels) constituting each character in the binary image, on the basis of the character region information and the character clipping rectangular information following the correction by the character clipping rectangle correction module 505. Then, on the basis of the specified positions of the pixels, the character area filling module 509 carries out a process for filling the pixels at the corresponding positions in the reduced multivalue image with the peripheral color thereof. The peripheral color may use the average of the pixel values of the pixels in the periphery of the character, and the pixel values of the pixels in the character may be replaced with the peripheral color that is found. Details of the filling process performed by the character area filling module 509 can be found in Japanese Patent Laid-Open No. 2002-077633, for example.

A JPEG compression module 510 generates compressed code 514, using the image data filled by the character area filling module 509 as an input.

The compressed code 511, character region information 512, character color information 513, and compressed code 514 obtained from the respective constituent elements in this manner are collected into a data group to generate compressed data 515.

Figure 6:
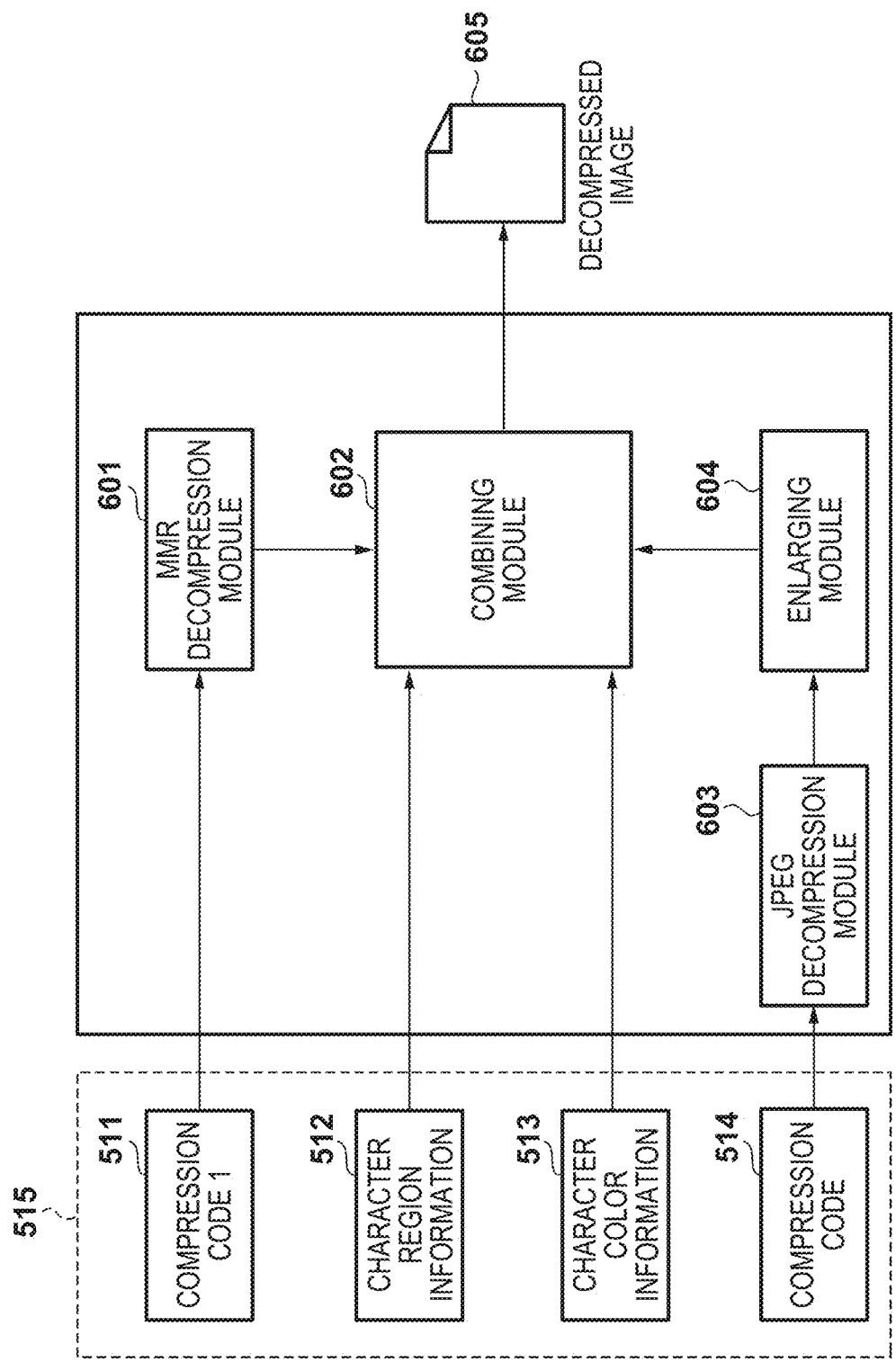
FIG. 6 is a block diagram for describing the configuration of an image decompression unit realized by the data processing unit, according to the first embodiment.

FIG. 6 is a block diagram for describing the configuration of the image decompression unit realized by the data processing unit 215 according to the first embodiment. Here, a case where compressed data sent from a separate device has the same data structure as the compressed data 515 will be described as an example. The processing by the image decompression unit is executed when decompressing and printing compressed data or the like.

A MMR decompression module 601 reproduces the binary image by carrying out a MMR decompression process on the compressed code 511 included in the file of the compressed data 515. A JPEG decompression module 603 reproduces the reduced multivalue image by carrying out a JPEG decompression process on the compressed code 514. An enlarging module 604 carries out an enlarging process on the reduced multivalue image decompressed by the JPEG decompression module 603 to generate a multivalue image having the same size as the pre-compression input image 501. A combining module 602 refers to the character region information 512, and assigns the color of the character color information (hereinafter, the character color information 513 indicating the character color) to the black pixels in the binary image decompressed by the MMR decompression module 601. Furthermore, the combining module 602 combines the binary image to which the character has been assigned with the multivalue image generated by the enlarging module 604 to generate a decompressed image 605. In this combination, a clear color is assigned to the white pixels in the binary image so that the multivalue image in the background is visible. In this manner, the image decompression unit generates the decompressed image 605 by decompressing the compressed data generated by the image compression unit. The decompressed image 605 is then sent to the printer unit 202 through the device I/F 214 and printed.

Details of the processing executed by the aforementioned character clipping rectangle correction module 505 will be described next with reference to FIGS. 3 and 4.

The character clipping rectangle correction module 505 further determines whether a character clipping rectangle is a character region or a non-character region on the basis of the binary image generated by the binarization module 502 and the character clipping rectangular information generated by the character clipping module 504. Note that if the input image 501 is held in the storage unit 211, the input image 501 may be used instead of the reduced multivalue image.

Figure 4:
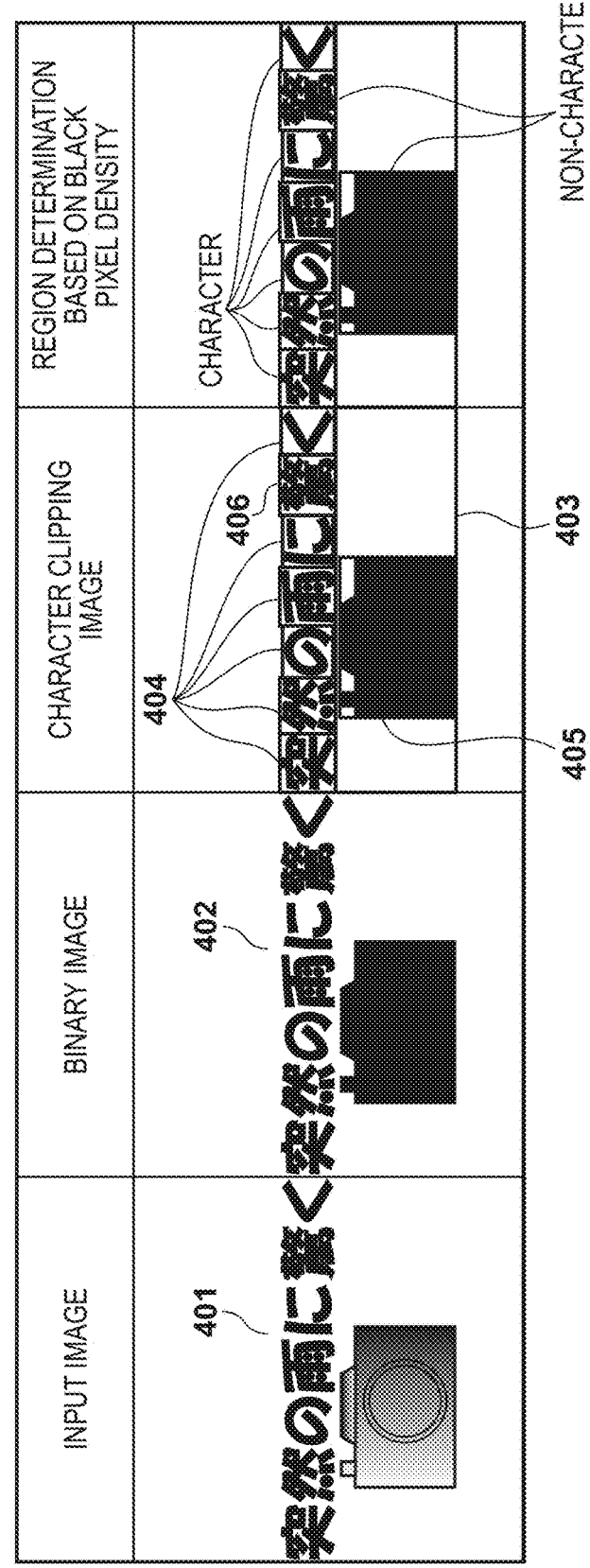
FIG. 4 depicts a view illustrating a specific example of a process for determining a character region in an input image, according to the first embodiment.

FIG. 4 depicts a view illustrating a specific example of the process for determining a character region in the input image, according to the first embodiment.

A reference numeral 401 in FIG. 4 indicates an example of an image in which a photo image in a nearby region containing a character string (having a large number of strokes and including bold characters) written over a white background. When the image 401 is binarized by the binarization module 502, the image indicated by a reference numeral 402 is generated. A reference numeral 403 denotes a region determined by the region determination module 503 to be a character region. Reference numerals 404 to 406 denote the results of the character clipping module 504 carrying out the clipping process on the character rectangles in the character region 403.

Figure 3:
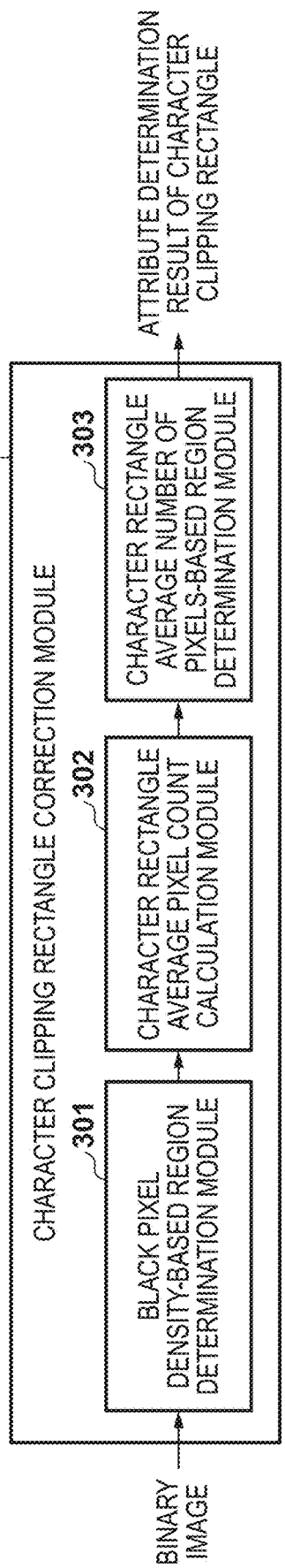
FIG. 3 is a block diagram for describing the functional configuration of a character clipping rectangle correction module according to the first embodiment.

FIG. 3 is a block diagram for describing the functional configuration of the character clipping rectangle correction module 505 according to the first embodiment.

A black pixel density-based region determination module 301 calculates the number of black pixels in the regions of the character clipping rectangles 404 to 406. If the calculated number of pixels is greater than a threshold, the character clipping rectangle is determined to have non-character attributes (be a non-character region). For example, the character clipping rectangle 404 has a low black pixel density within the character clipping rectangle, and is thus determined to have character attributes. On the other hand, the character clipping rectangles 405 and 406 have high black pixel densities within the character clipping rectangles, and are thus determined to have non-character attributes. As such, the character clipping rectangle 406, which is actually a character region, is erroneously determined to be a region having non-character attributes.

Hereinafter, a character clipping rectangle determined to have character attributes will be called a "character attribute rectangle", and a rectangle determined to have non-character attributes will be called a "non-character attribute rectangle". Accordingly, the region 405, which is originally a non-character region, is correctly determined to be a non-character region. An example of correctly determining the attributes of the character clipping rectangle 406, which has been determined to be a region having non-character attributes, will be described next.

A character rectangle average pixel count calculation module 302 counts the number of pixels in all of the character clipping rectangles, when those character clipping rectangles are character attribute rectangles. The number is then divided by the number of character attribute rectangles within the same character region to calculate the average number of pixels in the character attribute rectangles. To be more specific, assume that the resolution of the character region is 300 dpi and the font size in the character clipping rectangle 404 is 10.5 pt. In this case, the average number of pixels in the character attribute rectangles is approximately 2000. The average number of pixels in the character attribute rectangles will be called the "character rectangle average" hereinafter.

A character rectangle average number of pixels-based region determination module 303 determines whether or not each character clipping rectangle is a non-character attribute rectangle, and if it is determined that the rectangle is a non-character attribute rectangle, counts the number of pixels within the non-character attribute rectangle region. If the counted number of pixels is similar to the character rectangle average, the non-character attribute rectangle is determined to have character attributes. To be more specific, assume that, for example, the number of pixels in the character clipping rectangle 405 determined to have non-character attributes is 12000, and the number of pixels in the character clipping rectangle 406 determined to have non-character attributes is 2500. The average number of pixels in the character rectangles calculated by the character rectangle average pixel count calculation module 302, namely 2000, is subtracted from those values to find absolute values. If the absolute value is 1000, i.e., if the number of pixels in the non-character attribute rectangle is a value of from 50% to 150% of the character rectangle average, that non-character attribute rectangle is determined to have character attributes. When such is not the case, the non-character attribute rectangle is determined to have non-character attributes. Accordingly, in this example, the absolute value for the character clipping rectangle 405 is 10000, which is not a value of from 50% to 150% of the character rectangle average, and the rectangle is thus determined to have non-character attributes. On the other hand, the absolute value for the character clipping rectangle 406 is 500, which is a value of from 50% to 150% of the character rectangle average, and thus the rectangle is determined to have character attributes. Generally speaking, characters in a character string can be assumed to have the same size, and thus a non-character attribute rectangle having a number of pixels that is 50% to 150% of the character rectangle average is determined to have character attributes, also taking into account patterns in the character types and so on. The foregoing has been a description of the configuration of the character clipping rectangle correction module 505, with reference to FIG. 3.

Figure 8:
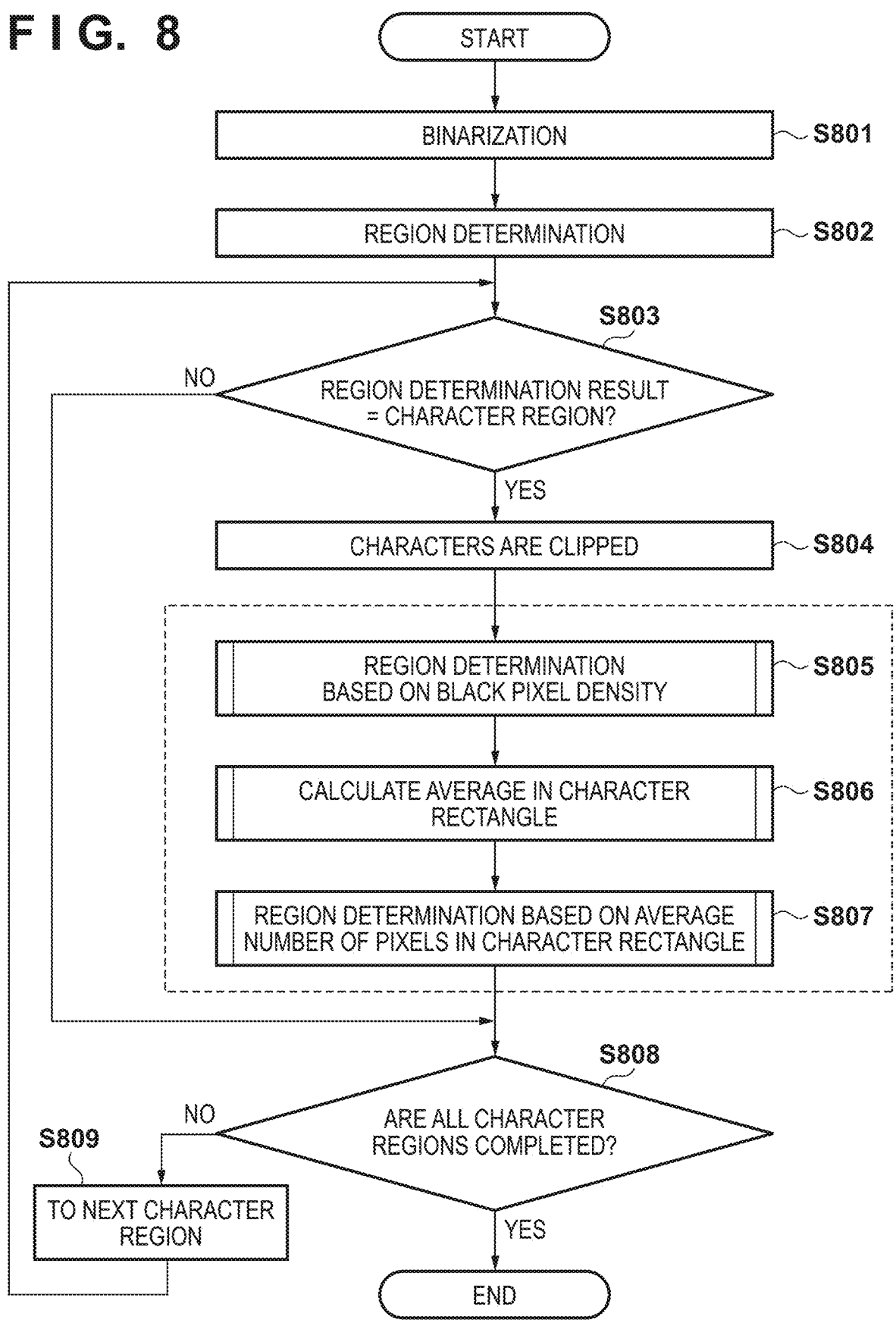
FIG. 8 is a flowchart for describing a process for determining a region and determining whether or not a character clipping rectangle has character attributes, carried out by the data processing unit according to the first embodiment.

FIG. 8 is a flowchart for describing a process for determining a region and determining whether or not a character clipping rectangle has character attributes, carried out by the data processing unit 215 according to the first embodiment. The descriptions of this processing will refer to FIGS. 2, 3, and 5 as appropriate. Note also that the processing by the character clipping rectangle correction module 505 corresponds to the processes from step S805 to step S807 in FIG. 8. As mentioned earlier, the functions of the data processing unit 215 are assumed to be realized by the CPU 205 executing programs deployed in the RAM 206.

First, in step S801, functioning as the binarization module 502, the CPU 205 binarizes the input image 501. The process then advances to step S802, where, functioning as the region determination module 503, the CPU 205 carries out the region determination on the binary image and determines whether the region in question is a character region or a non-character region. The process then advances to step S803, where the CPU 205 takes each region already subject to the determination as a region of interest, and determines whether the region of interest has been determined to be a character region, in sequence. The process advances to step S804 if the region has been determined to be a character region, and to step S808 if the region has been determined to be a non-character region. In step S804, functioning as the character clipping module 504, the CPU 205 generates character clipping rectangular information by clipping characters.

The process then advances to step S805, where, functioning as the black pixel density-based region determination module 301 of the character clipping rectangle correction module 505, the CPU 205 determines a region on the basis of the black pixel density. This will be described in detail with reference to the flowchart in FIG. 9.

Figure 9:
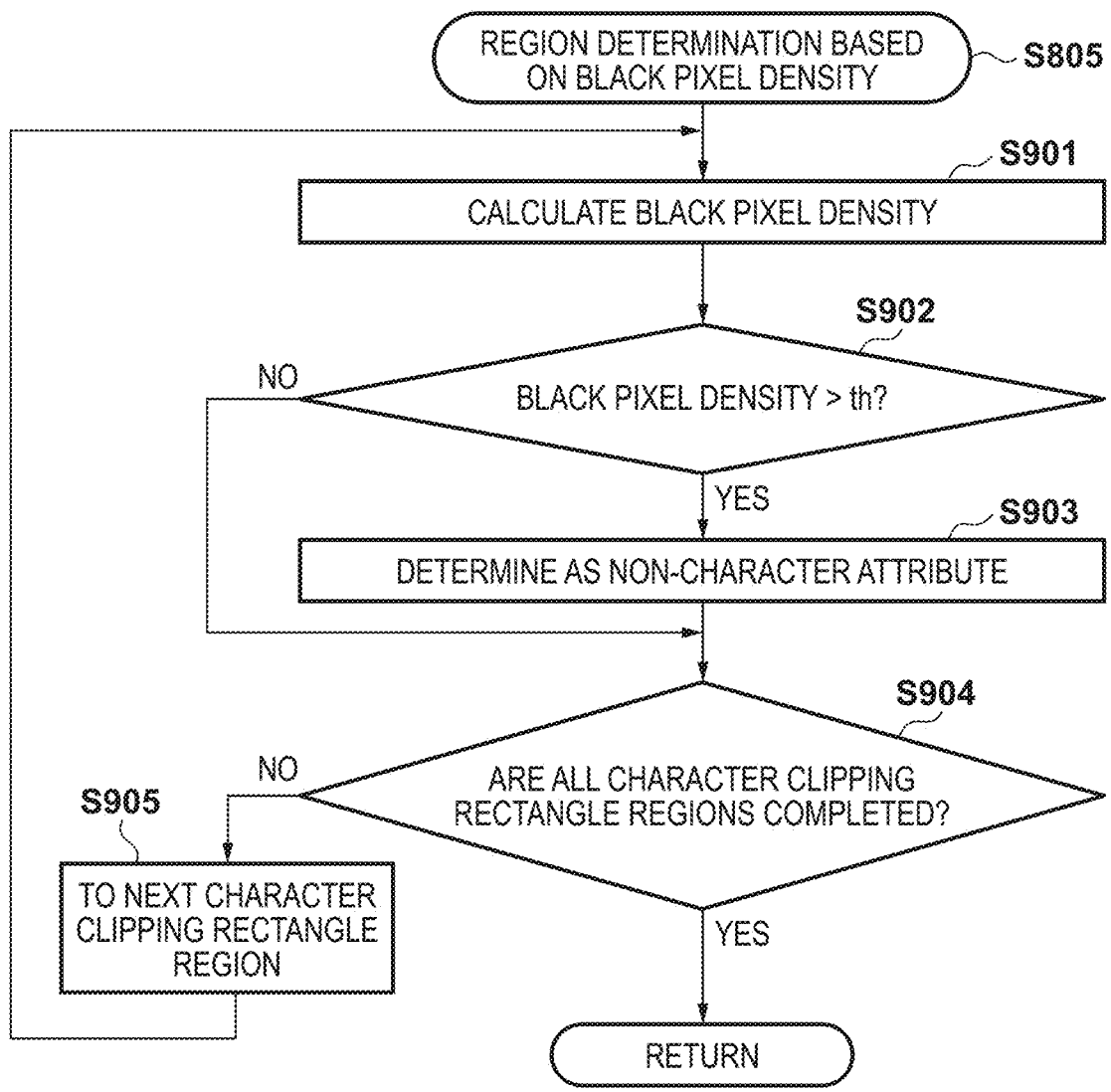
FIG. 9 is a flowchart for describing a process for determining a region based on the black pixel density, carried out in step S805 of FIG. 8.

FIG. 9 is a flowchart for describing a process for determining a region based on the black pixel density, carried out in step S805 of FIG. 8.

First, in step S901, the CPU 205 counts the number of black pixels within the character clipping rectangle, and calculates the density of black pixels within the character clipping rectangle. The process then advances to step S902, where the CPU 205 compares the black pixel density calculated in step S901 with a predetermined threshold (th), and determines whether or not the region is "a non-character region that has become completely black due to the binarization". In other words, when the black pixel density is higher than the predetermined threshold th, the region is determined to be "a region that is originally a non-character region but that has been erroneously determined to be a character region", the process advances to step S903. In step S903, the CPU 205 corrects that character clipping rectangle so as to have non-character attributes, and the process then advances to step S904. On the other hand, if the CPU 205 has determined in step S902 that the black pixel density is lower than the predetermined threshold th, the region is determined to be "a region that does indeed seem like a character", whereupon the process skips step S903 and advances directly to step S904. As a result, a region that is originally a non-character region, such as that indicated by a reference numeral 405 in FIG. 4, can be correctly determined to be a non-character region.

In step S904, the CPU 205 determines whether or not the processing is complete for all of the character clipping rectangles within the character region being processed. If the processing is determined to be complete, the flowchart ends, and the process advances to step S806. On the other hand, if in step S904 the CPU 205 determines that there is an unprocessed character clipping rectangle, the process advances to step S905, where the next character clipping rectangle is set to be processed. The process then returns to step S901.

In step S806, functioning as the character rectangle average pixel count calculation module 302, the CPU 205 calculates the average number of pixels in the character attribute rectangles within the current character region of interest. Details of this process will be given with reference to the flowchart in FIG. 10.

Figure 10:
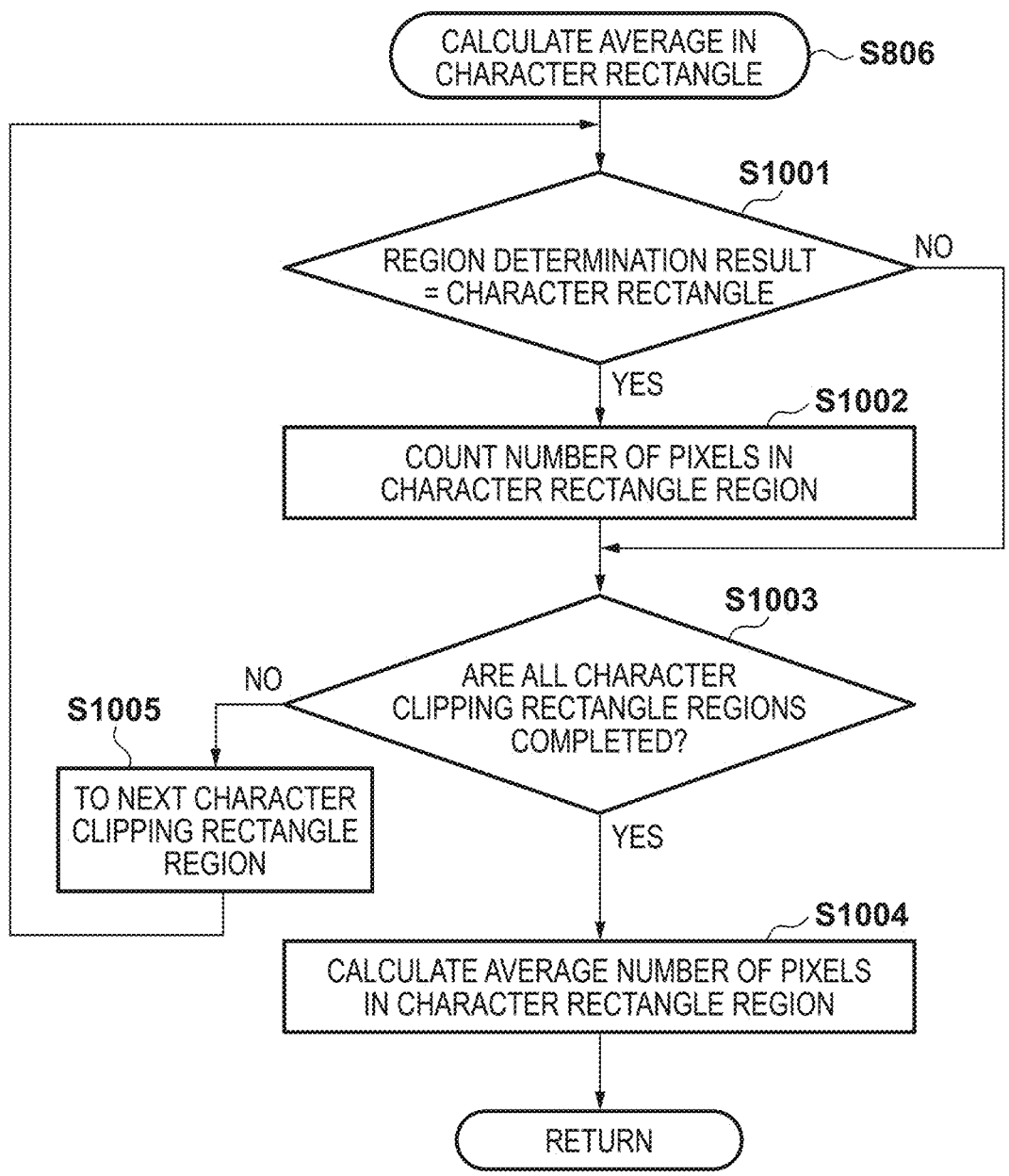
FIG. 10 is a flowchart for describing a process for calculating an average number of pixels in a character rectangle, carried out in step S806 of FIG. 8.

FIG. 10 is a flowchart for describing the process for calculating the average number of pixels in the character rectangle, carried out in step S806 of FIG. 8.

First, in step S1001, the CPU 205 determines whether or not the current character clipping rectangle of interest is a rectangle having character attributes. The process advances to step S1002 if it is determined that the rectangle has character attributes, and to step S1003 if not. In step S1002, the CPU 205 counts the number of all of the pixels in the character clipping rectangle determined to have character attributes. The process then advances to step S1003, where the CPU 205 determines whether or not the processing is complete for all of the character clipping rectangles within the current character region of interest. If the processing is determined to be complete, the process advances to step S1004. On the other hand, if in step S1003 the CPU 205 determines that there is an unprocessed character clipping rectangle, the process advances to step S1005, where the next character clipping rectangle is set to be processed. The process then returns to step S1001. In step S1004, the CPU 205 adds the numbers of pixels in all of the character attribute rectangle regions within that character region, counted in step S1002, and divides that total by the total number of character attribute rectangles used in the addition. The character rectangle average can be found as a result. Once this process ends, the flowchart itself ends, and the process advances to step S807.

The process then advances to step S807, where, functioning as the character rectangle average number of pixels-based region determination module 303, the CPU 205 re-determines whether or not the determination of the attributes of the character clipping rectangle, made by the black pixel density-based region determination module 301, was correct. Details of this process will be given with reference to the flowchart in FIG. 11.

Figure 11:
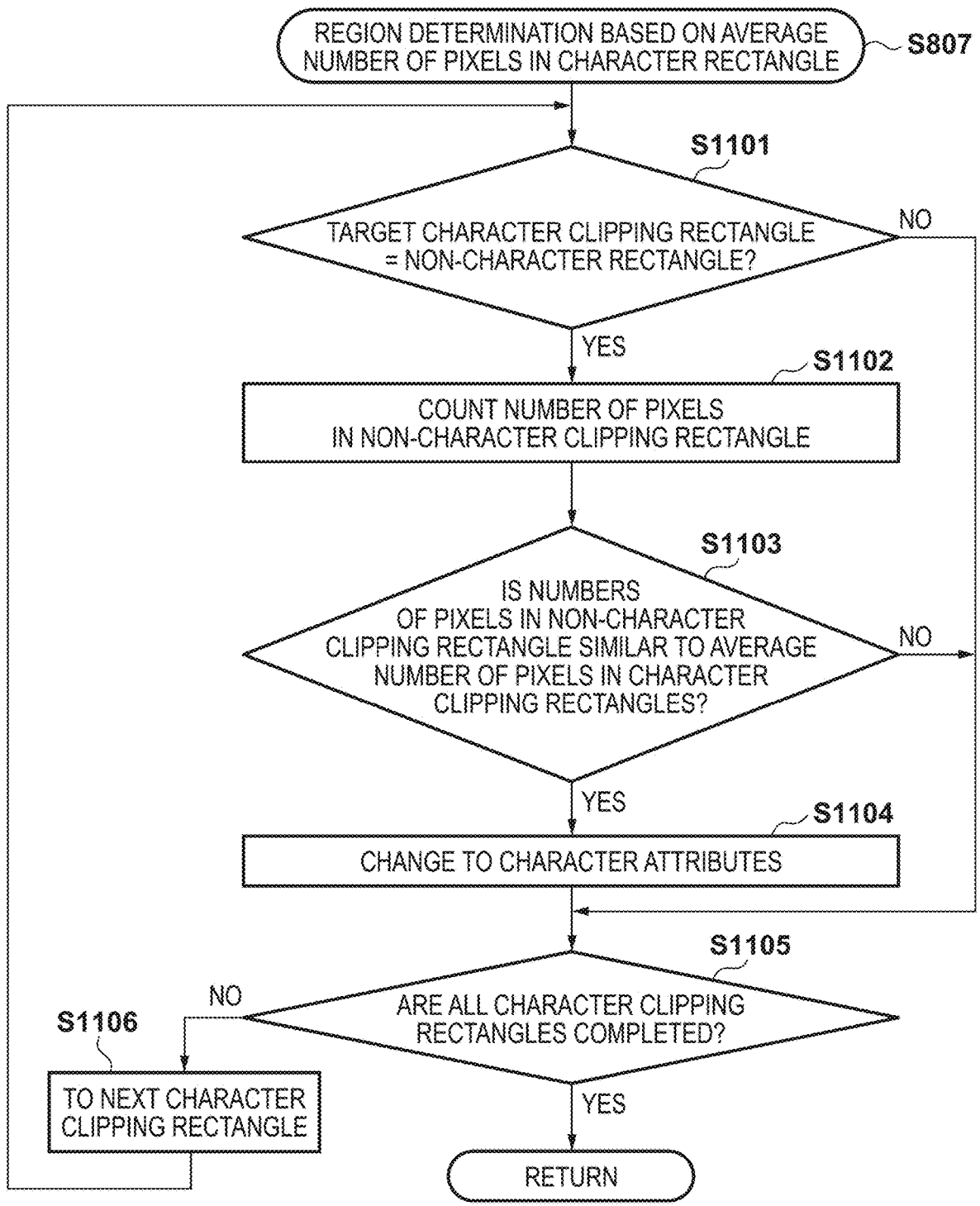
FIG. 11 is a flowchart for describing a process for determining a region based on an average number of pixels in a character rectangle, carried out in step S807 of FIG. 8.

FIG. 11 is a flowchart for describing the process for determining a region based on the average number of pixels in a character rectangle, carried out in step S807 of FIG. 8.

First, in step S1101, the CPU 205 determines whether or not the current character clipping rectangle has non-character attributes. The process advances to step S1102 if it is determined that the rectangle has non-character attributes, and to step S1105 if it is determined that the rectangle has character attributes. In step S1102, the CPU 205 counts the number of pixels within the character clipping rectangle having the non-character attributes. The process then advances to step S1103, where the CPU 205 determines whether or not the number of pixels in the rectangle having the non-character attributes, counted in step S1102, is similar to the average number of pixels of the character clipping rectangles within that character region that have character attributes, calculated in step S1004 of FIG. 10. As described earlier, the absolute value of the difference between the number of pixels within the character attribute rectangle and the average number of pixels is found, and it is determined whether or not the absolute value is from 50% to 150% of the average number of pixels in the character rectangles. If such is the case, the process advances to step S1104, where the CPU 205 changes the attributes of that character clipping rectangle to character attributes. The process then advances to step S1105. As a result, characters having a high number of strokes, bold characters, and so on, which were determined to have non-character attributes, can be correctly determined to be characters, by correcting the attributes of the character clipping rectangle based on the black pixel density, carried out in step S806. In step S1105, the CPU 205 determines whether or not the processing is complete for all of the character clipping rectangles within the current character region of interest. If the processing is determined to be complete, the processing indicated by this flowchart ends, and the process advances to step S808. On the other hand, if in step S1105 it is determined that there is an unprocessed character clipping rectangle, the process advances to step S1106, where the CPU 205 sets the next character clipping rectangle to be processed. The process then returns to step S1101.

In this manner, the process advances to step S808, where the CPU 205 determines whether or not the determination is complete for all of the character regions. If so, the process ends. However, if it is determined that there is an unprocessed region, the process advances to step S809, where the next character region is set to be processed. The process then returns to step S803.

According to the first embodiment as described thus far, whether a rectangle is a character rectangle or a non-character rectangle can be determined more accurately in units of character clipping rectangles. Accordingly, a problem of reduced legibility in a character string can be solved even when, for example, a low-quality character compressed using the JPEG format appears in a high-quality character string compressed using MMR.

Second Embodiment

Figure 15:
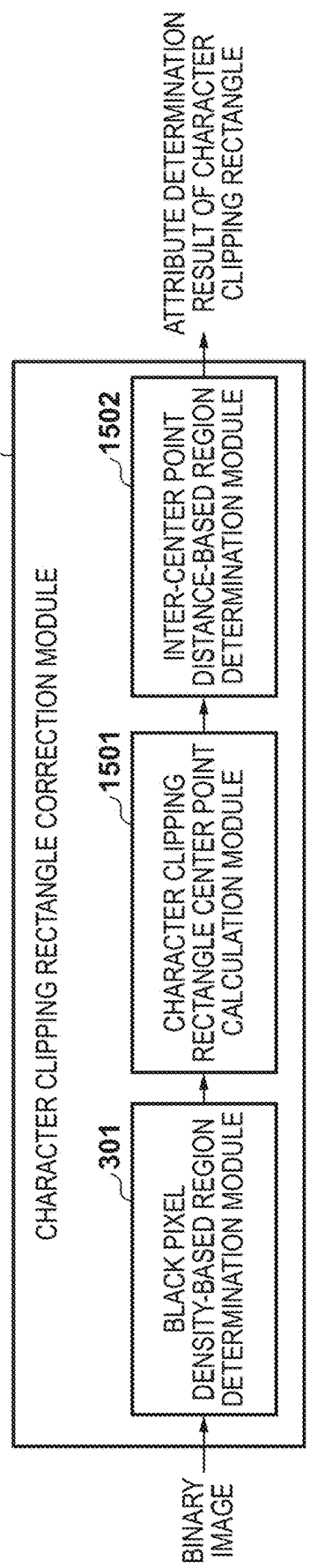
FIG. 15 is a block diagram for describing the functional configuration of a character clipping rectangle correction module according to the second embodiment.

FIG. 15 is a block diagram for describing the functional configuration of the character clipping rectangle correction module 505 according to a second embodiment.

In the second embodiment, the character clipping rectangle correction module 505 includes the same black pixel density-based region determination module 301 as in the first embodiment, as well as a character clipping rectangle center point calculation module 1501 and an inter-center point distance-based region determination module 1502, which are features of the second embodiment.

The character clipping rectangle center point calculation module 1501 calculates a center point of each character clipping rectangle. As the calculation method, the center point may be calculated from the vertical number of pixels and the horizontal number of pixels in the character clipping rectangle, for example. The inter-center point distance-based region determination module 1502 finds a distance between the center point of each character clipping rectangle having non-character attributes, within the character region of interest, and the center point of the nearest character clipping rectangle having character attributes. If the distance is shorter than a threshold (a predetermined value), the attributes of the character clipping rectangle are changed from non-character attributes to character attributes. Note that the hardware configuration of the system and the image forming apparatus according to the second embodiment are the same as those described in the above first embodiment, and thus descriptions thereof will be omitted.

Figure 12:
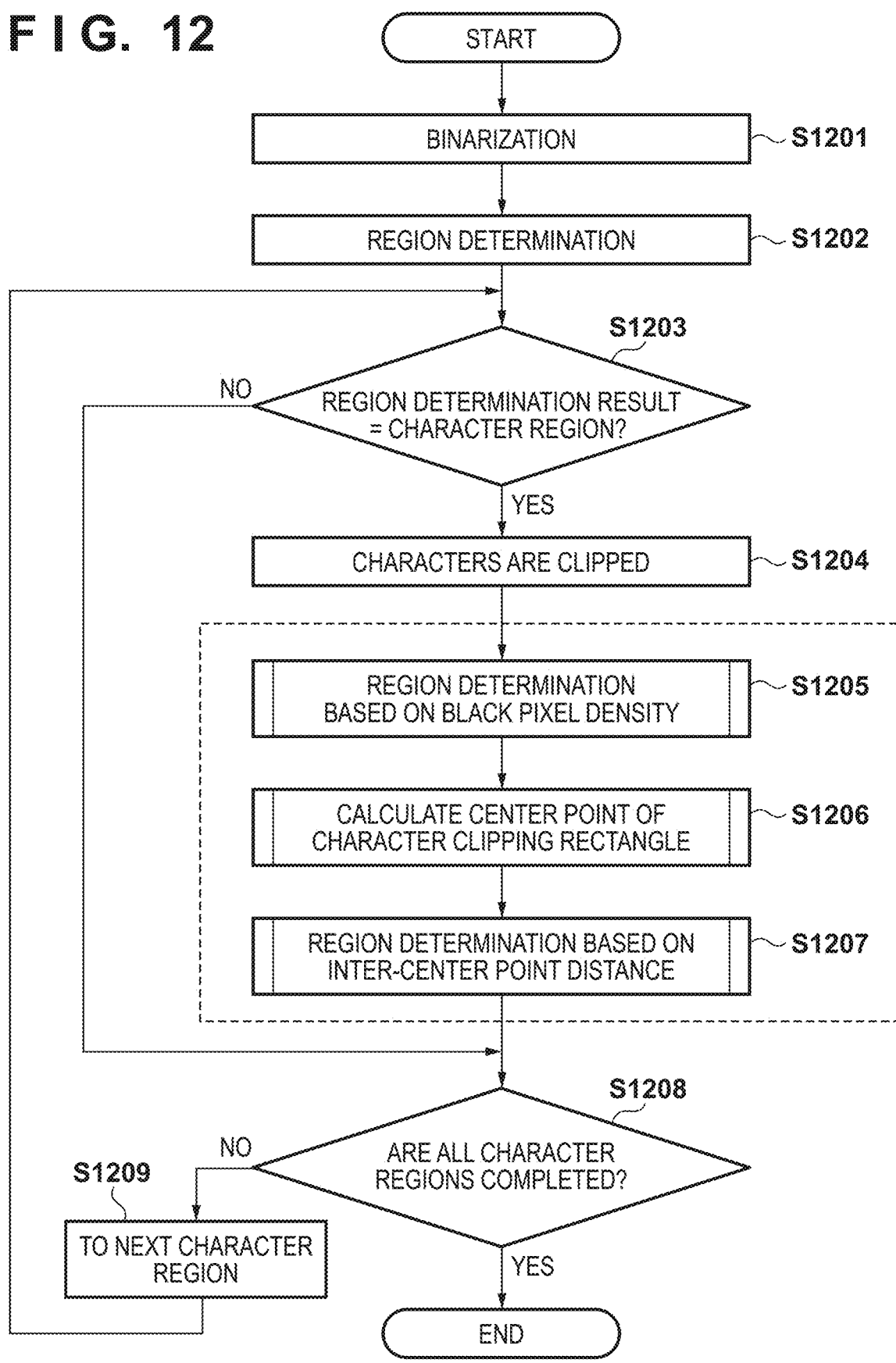
FIG. 12 is a flowchart for describing a process for determining a region and determining whether or not a character clipping rectangle has character attributes, carried out by a data processing unit according to a second embodiment.

FIG. 12 is a flowchart for describing a process for determining a region and determining whether or not a character clipping rectangle has character attributes, carried out by the data processing unit 215 according to the second embodiment. In FIG. 12, the processes of step S1201 to step S1205 are the same as the processes of step S801 to step S805 in FIG. 8, and thus descriptions thereof will be omitted.

In step S1206, functioning as character clipping rectangle center point calculation module 1501, the CPU 205 obtains the center point of a character rectangle. This process will be described in detail with reference to the flowchart in FIG. 13.

Figure 13:
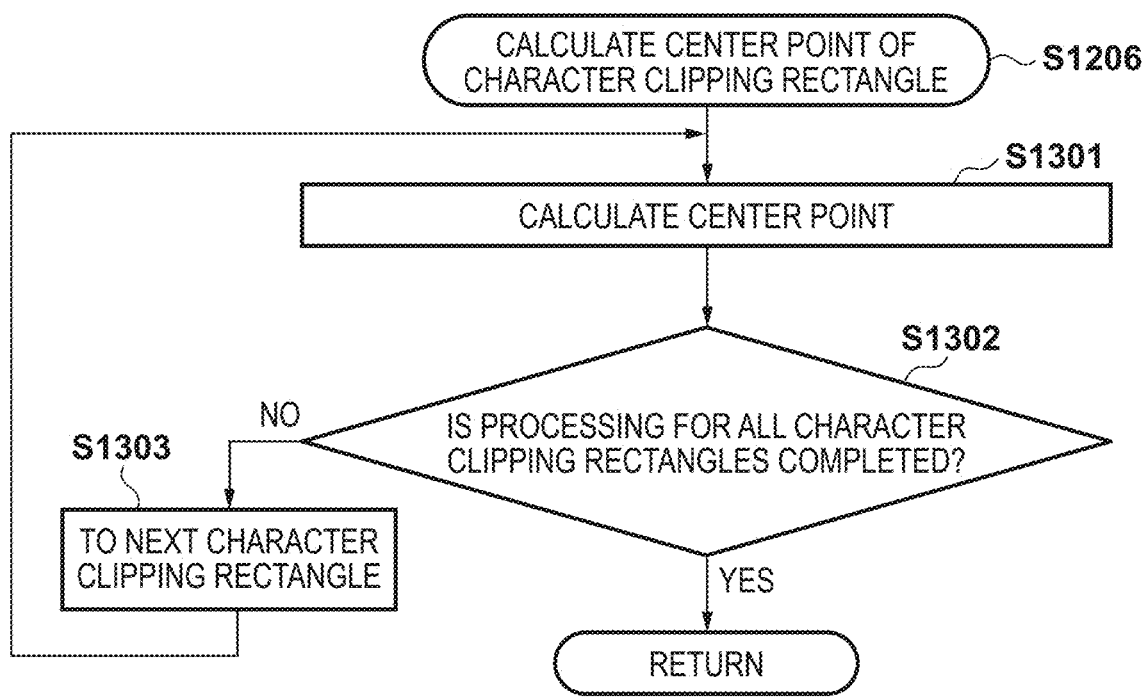
FIG. 13 is a flowchart for describing a process for finding a center point in a character clipping rectangle, carried out in step S1206 of FIG. 12.

FIG. 13 is a flowchart for describing the process for obtaining the center point in a character clipping rectangle, carried out in step S1206 of FIG. 12.

First, in step S1301, the CPU 205 obtains the center point of the character clipping rectangle in question. As mentioned earlier, this may be calculated from the vertical number of pixels and the horizontal number of pixels in the character clipping rectangle, or may be obtained from coordinates of the character clipping rectangle. In step S1302, the CPU 205 determines whether or not the processing is complete for all of the character clipping rectangles within the current character region of interest. If the processing is determined to be complete, the processing indicated by this flowchart ends, and the process advances to step S1207. On the other hand, if in step S1302 it is determined that there is an unprocessed character clipping rectangle, the process advances to step S1303, where the next character clipping rectangle to be processed is set. The process then advances to step S1301.

In step S1207, functioning as the inter-center point distance-based region determination module 1502, the CPU 205 carries out the region determination on the basis of the distance between center points. Details of this process will be given with reference to the flowchart in FIG. 14.

Figure 14:
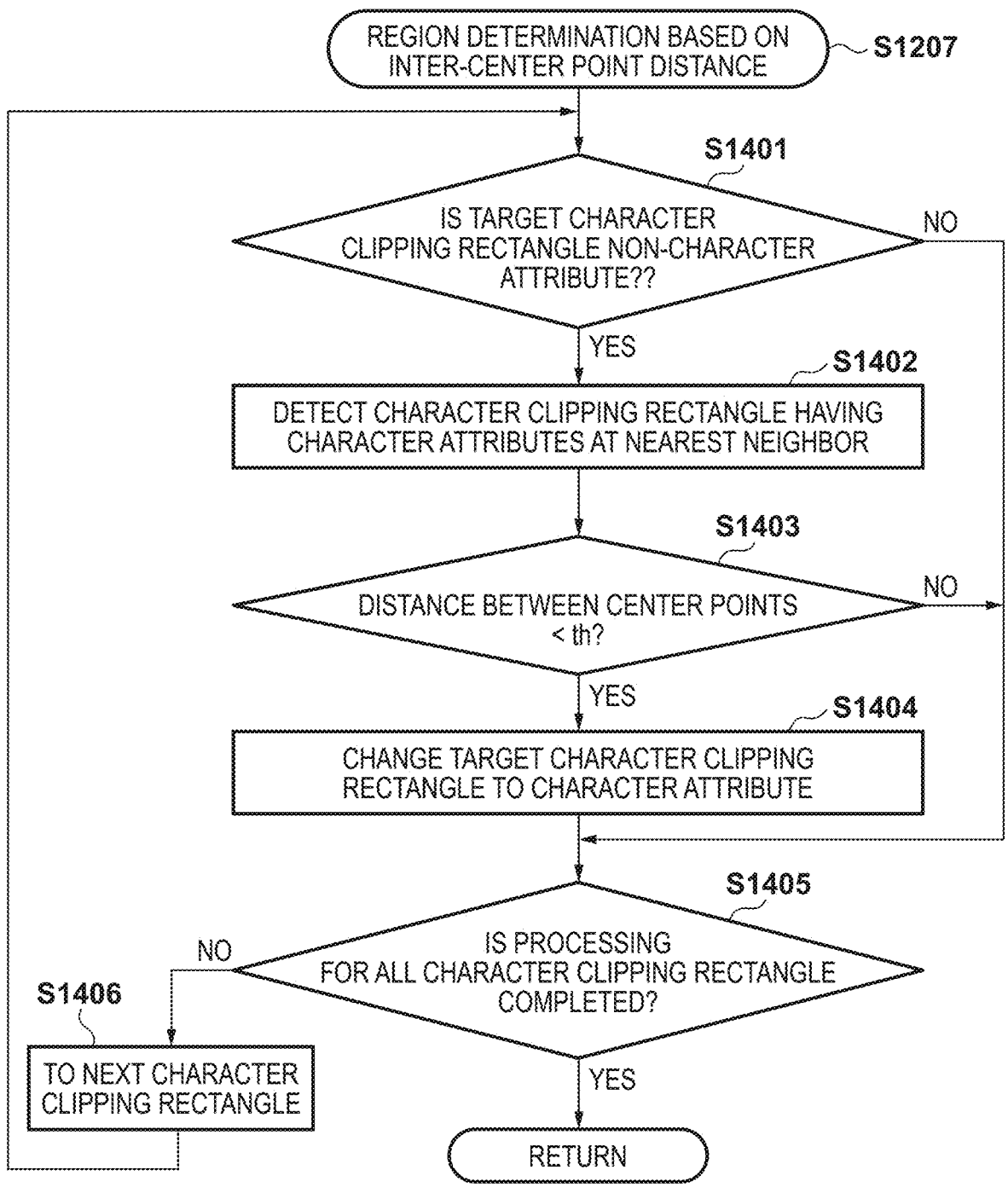
FIG. 14 is a flowchart for describing a process for determining a region based on the distance between center points, in step S1207 of FIG. 12.

FIG. 14 is a flowchart for describing the process for determining a region based on the distance between center points, in step S1207 of FIG. 12.

First, in step S1401, the CPU 205 determines whether or not the attributes of the current character clipping rectangle are non-character attributes. The process advances to step S1402 if the attributes are determined to be non-character attributes, and to step S1405 if not. In step S1402, functioning as the character clipping rectangle center point calculation module 1501, the CPU 205 detects the character clipping rectangle having character attributes at the nearest neighbor point from the center point of this character clipping rectangle having non-character attributes, i.e., the closest character clipping rectangle having character attributes. The nearest neighbor point is assumed to be found from a city block distance, a Euclidian distance, or the like, for example. The process then advances to step S1403, where functioning as the inter-center point distance-based region determination module 1502, the CPU 205 calculates the distance between the center point of the current character clipping rectangle having non-character attributes, and the center point of the nearest character clipping rectangle having character attributes, detected in step S1402. It is then determined whether or not the distance is shorter than a threshold th. If so, the process advances to step S1404, where the CPU 205 changes the attributes of the current character clipping rectangle, which has non-character attributes, to character attributes. The process then advances to step S1405. On the other hand, if in step S1403 the CPU 205 determines that the distance is longer than the threshold th, the attributes of the current character clipping rectangle, which are non-character attributes, are kept as non-character attributes, and the process then advances to step S1405. Here, setting the threshold th to, for example, twice the vertical direction length, or twice the horizontal direction length, of the current character clipping rectangle having non-character attributes makes it possible to determine whether or not the characters are in the same character string. This makes it possible to correctly determine characters having a large number of strokes and with a correspondingly high black pixel density, characters having different sizes from other characters, and so on within a character string. As a result, characters such as those in the aforementioned character clipping rectangle 406 illustrated in FIG. 4 can be determined correctly as well.

In step S1405, the CPU 205 determines whether or not the processing is complete for all the character clipping rectangles in the current character region of interest, and if it is determined that the processing is complete, that processing ends. The process then advances to step S1208. On the other hand, if in step S1405 it is determined that there is an unprocessed character clipping rectangle, the process advances to step S1406, where the next character clipping rectangle to be processed is set. The process then advances to step S1401.

After returning to FIG. 12, when the CPU 205 determines in step S1208 that the determination is complete for all of the character regions, the process ends. If it is determined that unprocessed regions remain, the process advances to step S1209, where the next character region is set to be processed. The process then returns to step S1203.

According to the second embodiment as described thus far, the attributes of a character clipping rectangle of interest are set on the basis of the attributes of a character clipping rectangle present within a predetermined distance from the character clipping rectangle of interest. This makes it possible to accurately and correctly determine the attributes even of characters having a large number of strokes, bold characters, large characters, and the like included in a character string.

In the second embodiment, the attributes of character clipping rectangles are determined using the distance between the center points of the character clipping rectangles. However, the aspect ratio of the character clipping rectangle may be used instead, for example. In other words, if a character clipping rectangle that has non-character attributes has an aspect ratio similar to a rectangle having character attributes, the attributes of that character clipping rectangle having non-character attributes are changed to character attributes. This makes it possible to accurately and correctly determine the attributes even of characters having a large number of strokes, bold characters, large characters, and the like included in a character string.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-180941, filed on Sep. 26, 2018, which is hereby incorporated by reference herein in its entirety.

What is claimed is:

1. An image processing apparatus comprising:
a memory device that stores instructions; and
at least one processor that executes the instructions stored in the memory device to cause the image processing apparatus to function as:
a binarizing unit configured to generate a binary image from a multivalue input image;
a detecting unit configured to detect a character region and a non-character region from the binary image;
a clipping unit configured to clip regions surrounding each of characters included in the character region detected by the detecting unit as character clipping rectangles;
a first determining unit configured to determine, on the basis of a black pixel density of the binary image included in the character clipping rectangle, whether or not the character clipping rectangle is a character region; and
a second determining unit configured to determine, on the basis of (a) a number of pixels included in the character clipping rectangle determined to be a non-character region by the first determining unit and (b) a number of pixels included in another character clipping rectangle included in the character region detected by the detecting unit, whether or not the character clipping rectangle determined to be a non-character region is a character region.

2. The image processing apparatus according to claim 1, wherein the second determining unit includes a first calculating unit configured to calculate an average number of pixels included in the character clipping rectangles determined to be character regions by the first determining unit, wherein when the absolute value of a difference between the average number of pixels, and the number of pixels included in the character clipping rectangle determined to be a non-character region by the first determining unit, is less than a predetermined value, the character clipping rectangle that has been determined to be a non-character region is determined to be a character region.

3. The image processing apparatus according to claim 2, wherein the predetermined value is a value of from 50% to 150% of the average number of pixels.

4. The image processing apparatus according to claim 1, wherein when the black pixel density of the binary image included in the character clipping rectangle is greater than a predetermined threshold, the first determining unit determines that the character clipping rectangle is a non-character region.

5. The image processing apparatus according to claim 1, wherein the detecting unit detects the character region and the non-character region using at least one of the size, shape, and black pixel density of a cluster of black pixels included in the binary image.

6. The image processing apparatus according to claim 5, wherein when the aspect ratio of a cluster of black pixels included in the binary image is near 1 and the size of the cluster of black pixels is within a predetermined range, the detecting unit detects that cluster of black pixels as a character region.

7. The image processing apparatus according to claim 1, wherein the at least one processor executes the instructions to further cause the image forming apparatus to function as:
a first compressing unit configured to compress the binary image in a character clipping rectangle determined to be a character region by the first determining unit and the second determining unit; and
a second compressing unit configured to compress the binary image in a character clipping rectangle determined to be a non-character region by the first determining unit and the second determining unit through a different compression method from the first compressing unit.

8. An image processing method comprising:
generating a binary image from a multivalue input image;
detecting a character region and a non-character region from the binary image;
clipping regions surrounding each of characters included in the character region detected in the detecting as character clipping rectangles;
making a first determination, on the basis of a black pixel density of the binary image included in the character clipping rectangle, as to whether or not the character clipping rectangle is a character region; and making a second determination, on the basis of (a) a number of pixels included in the character clipping rectangle determined to be a non-character region in the first determination and (b) a number of pixels included in another character clipping rectangle included in the character region detected in the detecting, whether or not the character clipping rectangle determined to be a non-character region is a character region.

9. A non-transitory computer-readable storage medium storing a program for causing a processor to execute an image processing method comprising:

generating a binary image from a multivalue input image;

detecting a character region and a non-character region from the binary image;

clipping regions surrounding each of characters included in the character region detected in the detecting as character clipping rectangles;

making a first determination, on the basis of a black pixel density of the binary image included in the character clipping rectangle, as to whether or not the character clipping rectangle is a character region; and making a second determination, on the basis of (a) a number of pixels included in the character clipping rectangle determined to be a non-character region in the first determination and (b) a number of pixels included in another character clipping rectangle included in the character region detected in the detecting, whether or not the character clipping rectangle determined to be a non-character region is a character region.

10. An image processing apparatus comprising:

a memory device that stores instructions; and at least one processor that executes the instructions stored in the memory device to cause the image processing apparatus to function as:

a binarizing unit that generates a binary image from a multivalue input image;

a detecting unit that detects a character region and a non-character region from the binary image;

a clipping unit that clips regions surrounding each of characters included in the character region detected by the detecting unit as character clipping rectangles;

a first determining unit that determines, on the basis of a black pixel density of the binary image included in the character clipping rectangle, whether or not the character clipping rectangle is a character region; and a second determining unit that determines, on the basis of (a) a number of pixels included in the character clipping rectangle determined to be a non-character region by the first determining unit and (b) a number of pixels included in another character clipping rectangle which is in the vicinity of the character clipping rectangle determined to be the non-character region, whether or not the character clipping rectangle determined to be the non-character region is a character region.

* * * * *